July 23, 1968   P. D. PICKENS   3,393,630

SKEWER HOLDING OVEN

Filed Feb. 25, 1966

HEAT

INVENTOR.
PAUL D. PICKENS
BY
Knox & Knox

United States Patent Office 3,393,630
Patented July 23, 1968

3,393,630
SKEWER HOLDING OVEN
Paul D. Pickens, 5746 Dolphin Place,
La Jolla, Calif. 92037
Filed Feb. 25, 1966, Ser. No. 530,157
3 Claims. (Cl. 99—259)

ABSTRACT OF THE DISCLOSURE

This is a skewer holding oven which acts as a heat and smoke retaining cover while permitting inspection of food being cooked as well as insertion and removal of individual skewers without disturbing the oven or the other skewers, and the skewer holding slots in the sides of the oven are such that the oven can be inverted with the skewers remaining in place therein.

Figure 1:
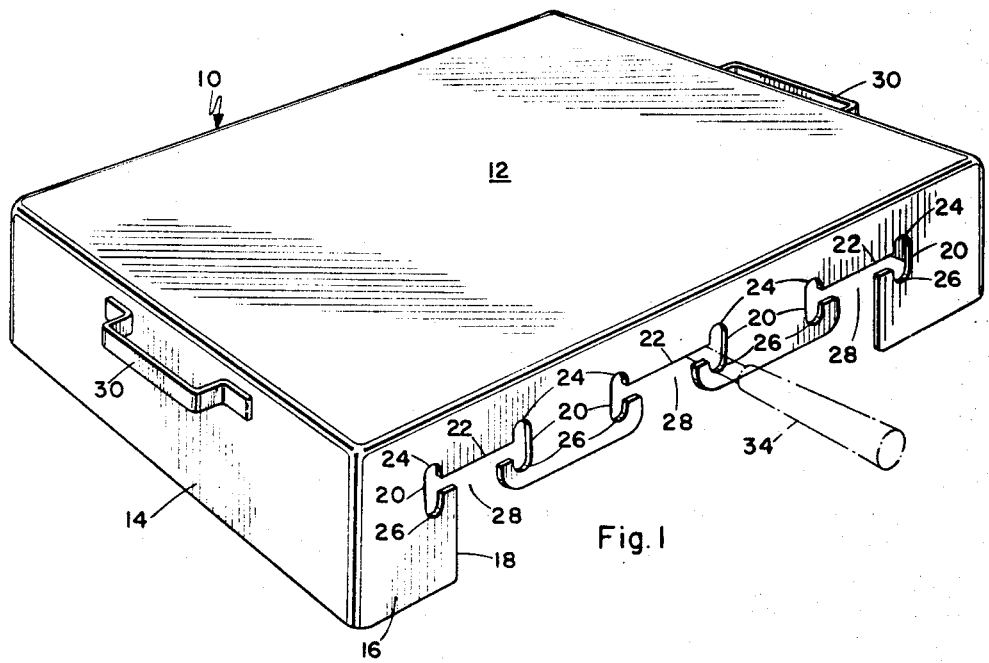

The present invention relates to cooking apparatus and specifically to a skewer holding oven.

The primary object of this invention is to provide a skewer holding oven in the form of a pan or open box, which is designed to be placed open side down over a source of heat and will retain and reflect the heat from its inner surfaces, making it possible to cook foods without constant turning of the skewers.

Another object of this invention is to provide an oven having a special arrangement of skewer holding slots which hold the skewers securely and allow the oven to be turned over if necessary for access to the food, without the skewers falling out of place.

Another object of this invention is to provide a skewer holding oven which is light in weight and readily portable, and can be carried comfortably when fully loaded.

A further object of this invention is to provide a skewer holding oven which is particularly suitable for use on a barbecue or brazier. In cooking some foods smoke is used to give a desirable flavor to the food, either by using certain woods, or by means of a special fuel additive. The box-like configuration of the oven retains the smoke around the food in a very efficient manner.

Figure 2:
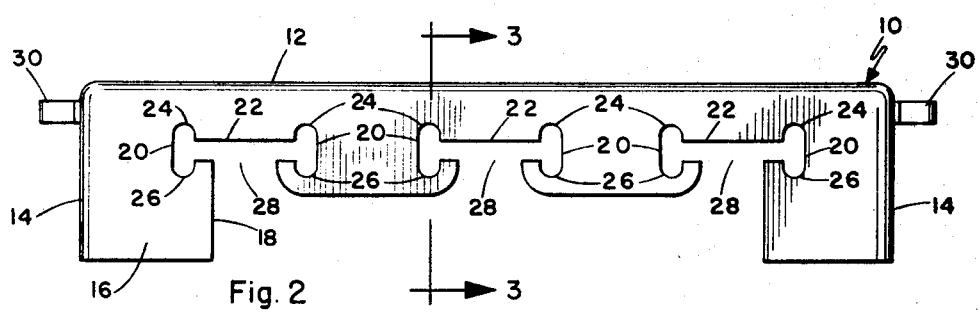
Figure 3:
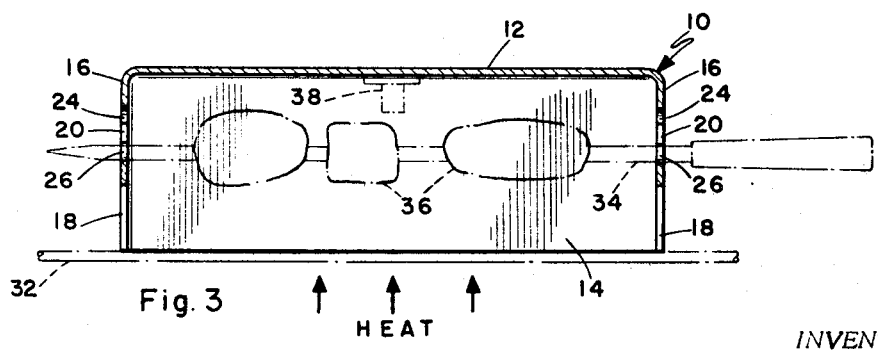

The oven and its use are illustrated in the drawing, in which:

FIGURE 1 is a perspective view of the oven;
FIGURE 2 is a side elvation view thereof; and
FIGURE 3 is a sectional view taken on line 3—3 of FIGURE 2.

Similar characters of reference indicate similar or identical elements and portions throughout the specification and throughout the views of the drawing.

The oven 10 is a box-like unit having a closed top 12, substantialy vertical closed ends 14 and side walls 16, the bottom being open. A simple rectangular form is illustrated, but other shapes could be used for special purposes or for decorative appearance.

Each side wall 16 is cut in a similar manner to provide an arrangement of skewer holding slots or notches. A cut-out portion 18 extends upward from the lower edge and longitudinally of each side wall, and along the top of the cut-out are horizontally spaced, vertically elongated slots 20 which are connected in pairs by horizontal slots 22. The vertical slots 20 extend above and below horizontal slots 22 to form opposed notches 24 and 26 at the upper and lower ends, respectively, of said vertical slots. The lower sides of horizontal slots 22 have openings 28 to the cut-out portion 18, so that the notches are well accessible from the cut-out. The proportions of the oven and the number and spacing of the notches can vary according to specific requirements.

On each end 14 is a handle 30, preferably on the upper portion for ease of handling. Handles 30 may be of any suitable type and may be heat insulated if desired.

If the oven is made from metal the inner surfaces, or at least the inner surface or undersurface of top 12, may be left in natural metal, or polished, or treated in any suitable manner to enhance reflection of heat. Other materials may be suitably finished to provide a reflective inner surface which is, in use, the undersurface of the closed top 12.

The oven is normally used over a fire, such as in a barbeue or brazier, with the oven supported on the bars of a grille, as indicated at 32 in FIGURE 3. Any other suitable source of heat and means for supporting the oven may be used, however. For convenience the oven may be loaded in the inverted position with the open side up. Skewers 34 carrying food 36 are inserted through openings 28 and slid laterally to drop into the upper notches 24, which hold the skewer at both ends. The oven can then be turned over, generally about a longitudinal axis between handles 30, the skewers sliding down slots 20 into the lower notches 26 without falling out of place. While the oven is in place over the fire, individual skewers can be lifted out of their notches and withdrawn through the cut-out portions 18 for inspection of the food, then just as easily replaced if further cooking is needed. The oven effectively contains heat and reflects a considerable amount of heat to the upper portions of the food, so that complete cooking will be possible with little or no turning of the skewers and in less time than the usual open cooking. When smoke is used in the cooking process the smoke is contained within the oven to permeate the food effectively.

To extend the degree of control over cooking, the oven may be fitted with socket member 38, indicated in broken line in FIGURE 3, which is secured on the underside of top 12 to receive the vertically adjustable post found on many types of barbecue or brazier units. The socket member is of the conventional type used on an adjustable grille which can be raised and lowered to vary the distance between the source of heat and the food.

As an added convenience the oven may be used in inverted position to hold the cooked food in readiness for serving, in order to catch any grease or juices which might drip from the food. The utility of the oven is greatly increased by its ability to be handled upright or inverted when loaded with skewers and food.

It is understood that minor variation from the form of the invention disclosed herein may be made without departure from the spirit and scope of the invention, and that the specification and drawing are to be considered as merely illustrative rather than limiting.

I claim:
1. A skewer holding oven, comprising:
   a box-like container having, in operative cooking position, a closed top and ends, side walls between said ends, and an open bottom;
   said side walls having opposing slots opening to the lower portions of the side walls and said slots being configured to retain skewers spanning said side walls with said closed top uppermost in said cooking position;
   said closed top having a heat reflective undersurface;
   and said slots having upper and lower opposed notches to hold skewers therein in upright and inverted positions of the oven.
2. A skewer holding oven, comprising:
   a box-like container having, in operative cooking position, a closed top and ends, side walls between said ends, and on open bottom;
   said side walls having opposing slots opening to the lower portions of the side walls and said slots being configured to retain skewers spanning said side walls with said closed top uppermost in said coking position;

said closed top having a heat reflective undersurface;

and each of said side walls having a cut-out portion extending upwardly from the lower edge thereof and longitudinally of each side wall, all of said slots opening to and being accessible from said cut-out portions, and said cut-out portions giving visual access to food being cooked on said skewers and facilitating removal and re-insertion of said skewers without the necessity of moving the oven.

3. A skewer holding oven, comprising:

a box-like container having, in operative cooking position, a closed top and ends, side walls between said ends, and an open bottom;

said side walls having opposing slots opening to the lower portions of the side walls and said slots being configured to retain skewers spanning said side walls with said closed top uppermost in said cooking position;

said closed top having a heat reflective undersurface;

each of said side walls having a cut-out portion extending upwardly from the lower edge thereof, said slots opening to said cut-out portion; and said slots including substantially vertical slots, the upper and lower ends of which comprise notches, and horizontal slots interconnecting said vertical slots in pairs between the upper and lower ends thereof, said horizontal slots opening downwardly to said cut-out portions.

References Cited

UNITED STATES PATENTS

| | | | |
|---|---|---|---|
| 136,980 | 3/1873 | Dyke | 99—397 X |
| 362,483 | 5/1887 | Battis | 99—397 |
| 363,519 | 5/1887 | Houston | 99—419 X |
| 2,253,788 | 8/1941 | Kern | 211—45 |
| 2,762,292 | 9/1956 | Chicknavorian | 99—421 |

FOREIGN PATENTS 26,502  11/1906  Austria.

WALTER A. SCHELL, *Primary Examiner.*

J. M. NEARY, *Assistant Examiner.*